June 20, 1939.　　　　　D. L. HAY　　　　　2,162,719
COMBINATION SPRING BELLOWS CONTROL DEVICE
Filed June 14, 1938
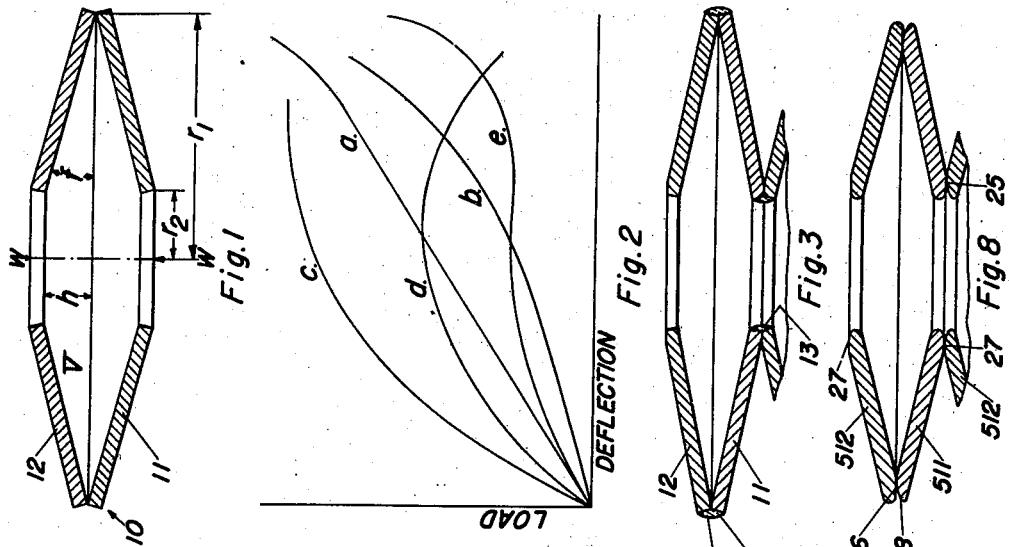
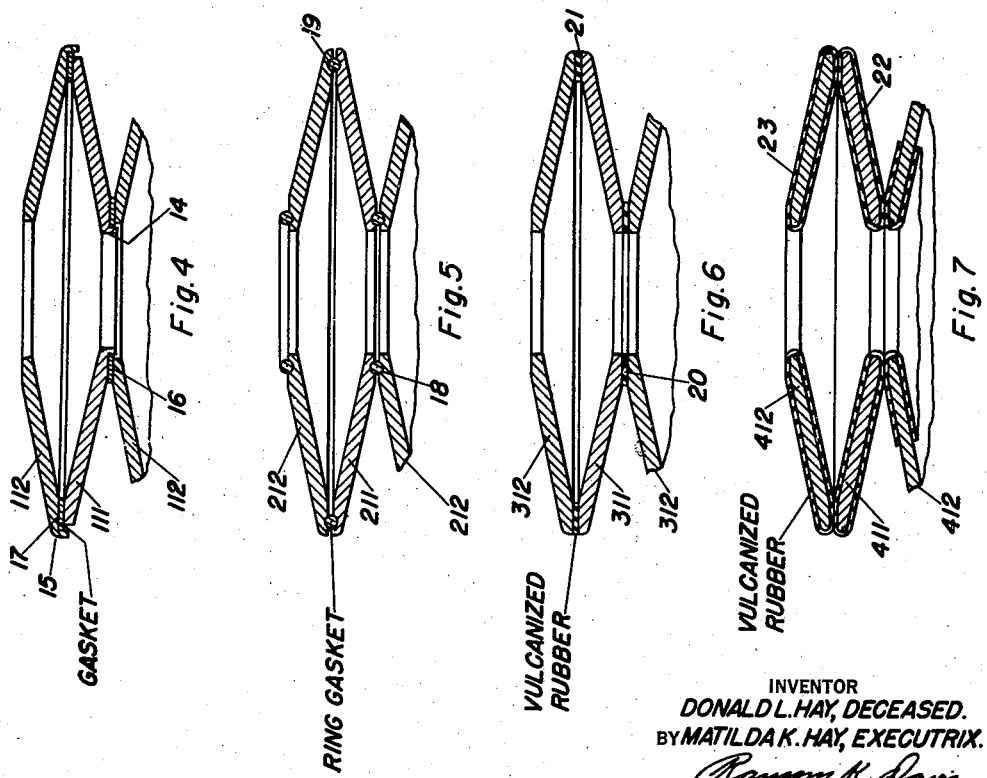
INVENTOR
DONALD L. HAY, DECEASED.
BY MATILDA K. HAY, EXECUTRIX.
ATTORNEY Patented June 20, 1939

2,162,719

UNITED STATES PATENT OFFICE 2,162,719

COMBINATION SPRING BELLOWS CONTROL DEVICE

Donald L. Hay, deceased, late of Washington, D. C., by Matilda K. Hay, executrix, Washington, D. C.

Application June 14, 1938, Serial No. 213,727

5 Claims. (Cl. 267—1)

(Granted under the act of March 3, 1883, as amended April 30, 1928; 370 O. G. 757)

This invention relates to a combination spring bellows control device, and has for an object to provide a control device to take the place of pistons, diaphragms, or bellows of various types in such devices as pressure regulators, temperature regulators, pressure and temperature gauges, fluid pressure operated devices, etc.

A further object of this invention is to provide an improved spring bellows control device which overcomes inherent disadvantages in certain respects of the former control devices, among which are the fact that pistons are subject to leakages and frictional resistance to motion, diaphragms are of large diameter in proportion to their effective piston area, are very flexible when made sufficiently heavy to withstand high pressures, and the allowable motion thereof is small.

Furthermore, in such prior devices auxiliary spring members must be added to produce an elastic restoring force where such is necessary to return the moving part to an equilibrium position. A usually undesirable property of the simple diaphragm is that the effective spring coefficient increases rapidly with increasing displacements from the equilibrium position, necessitating the use of a very large diaphragm having a small coefficient in the working range, as well as an auxiliary spring to obtain the desired overall coefficient when an approximate coefficient is required.

The usual form of bellows, for example, the "Sylphon" bellows, has similar disadvantages, in that it is difficult in practice to predetermine the stiffness coefficient, and the coefficient obtained is variable and uncertain, necessitating an otherwise unnecessarily flexible unit and auxiliary spring.

Among the advantages of the herein invention are that it is simple in construction, it needs no auxiliary springs, but has the required stiffness built into the unit, the spring characteristic of which may be accurately predetermined. Further, by simple advantages in design a wide variety of fluid pressure displacement characteristics may be obtained. It may be designed to be capable of withstanding many times its normal working pressure without damage of any kind, and it is particularly free from friction or hysteresis losses, and the volume occupied by the unit is less than that required for the combination of diaphragm and spring or bellows and spring of corresponding characteristics.

With the foregoing and other objects in view, the invention consists in the construction, combination and arrangement of parts hereinafter described and illustrated in the drawing, in which, Fig. 1 is a sectional view through a single unit of the spring bellows of this invention before any sealing means is applied.

Fig. 2 is a graph of several load deflection curves which may be obtained by appropriate choice of dimensions.

Fig. 3 is a sectional view of the invention showing a welding form of sealing means.

Fig. 4 is a similar view, showing one form of gasket sealing means.

Fig. 5 is a similar view, showing another form of gasket sealing means.

Fig. 6 is a similar view showing one form of vulcanized rubber sealing means.

Fig. 7 is a similar view, showing another form of vulcanized rubber sealing means, and Fig. 8 is a similar view of still another form with a ground fit between the washers.

There is shown at 10 the combination spring bellows control device of this invention, which consists basically of a set of dished washers 11 and 12, commonly known as "Belleville springs", assembled into a stack with the outer and inner edges alternately in contact, the edges in contact being sealed in any suitable manner against leakage of fluid between them. In thus sealing the edges together the contacting faces may be suitably ground to provide flat contacting faces, as shown in each of Figs. 3 to 8, inclusive. In Figs. 3 to 8, inclusive, different means of sealing these washers 11 and 12 are graphically illustrated. In Fig. 3 the edges of the dished washers 11 and 12 are sealed together by having their ends welded as at 13. This method is more suitable for thin, flexible washers, and not with thick washers, where the weld may crack under repeated deflections.

In Fig. 4 the washer 111 has its inner edge provided with a flange 14, while the washer 112 has its outer edge provided with a depending flange 15, whereby to hold a small gasket 16 and a large gasket 17 properly in position between the meeting edges of the washers 111 and 112, the meeting edges being provided with flat or slightly convex faces meshed or ground around the edges so as to make suitable seats for the gaskets, the gaskets being of any suitable material such as soft packing or metal.

In Fig. 5 the washers 211 and 212 are each provided with countersunk semi-cylindrical recesses so as to receive ring gaskets 18 and 19 in cooperating sealing relation therebetween. The ring gaskets 18 and 19, if made of sufficiently strong material, also act to center the washers.

In Fig. 6 the washers 311 and 312 have their inner and outer edges sealed together by vulcanized rubber gaskets 20 and 21.

In Fig. 7 the washers 411 and 412 are sealed at their inner and outer meeting edges by being enclosed in vulcanized rubber jackets 22 and 23, which are vulcanized or cemented together at their lines of contact.

In Fig. 8 the dished washers 511 and 512 are provided with a ground fit therebetween. The inner contacting face 25 of washer 511 and outer contacting face 26 of washer 512 is ground flat, while the inner contacting face 27 of washer 512 and outer contacting face 28 of washer 511 are ground convex to allow a rolling contact during compression and extension.

Referring to Fig. 1, there is shown a pair of "Belleville spring" washers 11 and 12. When a load is applied axially to these discs, as indicated by the arrows W, the discs flatten and the height $h$ decreases. At the same time there is a slight increase in the outside diameter and a smaller decrease in the inside diameter. On account of these changes in diameter it is desirable to use an even number of discs in pairs similar to that shown in Fig. 1, to eliminate frictional or hystereses effects.

Spring washers of this type have the desirable characteristic that by varying the four dimensions, outside diameter, inside diameter, thickness, and angle of dish ($f$, Fig. 1) a wide variety of load-deflection relations may be obtained. Several load-deflection curves which may be obtained by suitable choice of dimensions are shown in Fig. 2. Referring to this figure, curve $a$ shows a linear response similar to that obtained with an ordinary coil or leaf spring. Curve $b$ illustrates the response for a design in which the spring coefficient is not constant as in curve $a$, but increases with increasing deflection. For the springs represented by curves $c$ and $d$ the spring coefficient decreases with increasing deflection. In curve $d$ the coefficient actually decreases to zero and then becomes negative for the large deflections. This type of response is very useful when it is desired to obtain in a small space a spring having a low spring coefficient at a high working load. By proper design it is possible to combine the characteristics of curve $c$ and $b$ in the same spring as shown by curve $e$.

These possible characteristics of the "Belleville" spring washer are well known and are merely included to show the wide variety of fluid pressure-displacement characteristics which may be obtained with this control device. It is evident that when these discs are assembled into a fluid-tight bellows and fluid pressure applied to the exterior, the pressure-displacement curves will be similar to those shown in Fig. 2, in which case the abscissae will be pressures (e. g., lbs./sq. in.) instead of load (lbs.).

For such a bellows the equivalent load (lbs.) applied is equal to the pressure applied (lbs./sq. in.) multiplied by the effective area of the disc.

An approximate mathematical expression for the effective area of a disc may be found as follows: Referring to Fig. 1, the volume included by a single disc is in the form of a truncated cone having a lower base of radius $r_1$, upper base of radius $r_2$, and altitude, $h$. The volume is then given by the usual expression $$V = \frac{\pi}{3}(r_1^2 + r_1 r_2 + r_2^2)h \qquad (1)$$

Then for a small change in $h$ produced by a small change in pressure $$dV = \frac{\pi}{3}(r_1^2 + r_1 r_2 + r_2^2)dh \qquad (2)$$

But from the definition of the effective area $A$ this change in volume is $$dV = A dh \qquad (3)$$

Equating Equations 2 and 3

$$dV = A dh = \frac{\pi}{3}(r_1^2 + r_1 r_2 + r_2^2)dh \qquad (4)$$

from which it follows that the effective area is $$A = \frac{\pi}{3}(r_1^2 + r_1 r_2 + r_2^2) \qquad (5)$$

and the total load W on the spring for applied external pressure, P, is $$W = A \cdot P$$

$$= \frac{\pi}{3}(r_1^2 + r_1 r_2 + r_2^2) \cdot P \qquad (6)$$

By means of this expression (Eq. 6) the approximate pressure-deflection characteristic may be found when the load-deflection characteristic is given. This expression has been found to be in good agreement with experimental tests.

The particular application of this idea of making disc spring bellows depends primarily upon a practical method of sealing the outer and inner edges of the dished washers at the lines of contact without affecting their action, and with sufficient flexibility to prevent cracking or leakage after continued use. Various methods of so sealing these dished washers together have already been described with reference to Figs. 3 to 8, inclusive, above.

The forms of sealing bellows units shown in Figs. 6 and 7, have been used with excellent results in control elements for high pressure air reducers, the bellows operating continuously under normal pressures of 200 lbs. per square inch. This use is described in detail in a separate application for Letters Patent, filed concurrently herewith, Navy case 1693.

It is evident that this form of bellows may be used in many applications where it is required to have a spring whose motion is mechanically damped to decrease or prevent oscillation. To accomplish that it is only necessary to restrict the flow of fluid into and out of the interior of the bellows by means of a suitable orifice or valves. This arrangement is suitable for use as a combined spring and "shock absorber" for use on automobiles and the like, such as shown in U. S. Patent 1,668,669.

Other modifications and changes in the proportions and arrangements of the parts may be made by those skilled in the art without departing from the nature of the invention, within the scope of what is hereinafter claimed.

The invention described herein may be manufactured and used by or for the Government of the United States for governmental purposes without the payment of any royalties thereon or therefor.

Having thus set forth and disclosed the nature of this invention, what is claimed is:

1. A combination spring bellows control device comprising resilient dished washer members, said resilient dished washer members being stacked with their convex sides alternately up and down, and means for sealing the contacting inner and outer edges of said dished washer members to each other, said sealing means comprising a gasket member placed between each of the inner and outer contacting faces, said gasket member being of vulcanized rubber, bonded to each contacting face.

2. A combination spring bellows control device comprising resilient dished washer members, said resilient dished washer members being stacked with their convex sides alternately up and down, and means for sealing the contacting inner and outer edges of said dished washer members to each other, said sealing means comprising a gasket member placed between each of the inner and outer contacting faces, said gasket member being of vulcanized rubber, bonded to each contacting face, said bonded vulcanized rubber gasket forming part of a vulcanized rubber jacket enclosing each dished washer member.

3. A combination spring bellows control device comprising resilient dished washer members, said resilient dished washer members being stacked with their convex sides alternately up and down, and means for sealing the contacting inner and outer edges of said dished washer member to each other, said sealing means comprising a gasket member placed between each of the inner and outer contacting faces, said gasket member being countersunk between the contacting edges of said dished washer member.

4. A combination spring bellows control device comprising resilient dished washer members, said resilient dished washer members being stacked with their convex sides alternately up and down, and means for sealing the contacting inner and outer edges of said dished washer member to each other, said sealing means comprising a gasket member placed between each of the inner and outer contacting faces, said gasket member being countersunk between the contacting edges of said dished washer members, said gasket member being circular in cross-section.

5. A combination spring bellows control device comprising resilient dished washer members, said resilient dished washer members being stacked with their convex sides alternately up and down, and means for sealing the contacting inner and outer edges of said dished washer members to each other, said sealing means comprising a ground fit between said contacting faces of said dished washer members, one of said contacting faces being flat and the other of said contacting faces being convex.

MATILDA K. HAY.
*Executrix of the Estate of Donald L. Hay, Deceased.*